Feb. 1, 1966 W. P. O'MALLEY 3,232,211
CONTINUOUS BREWING APPARATUS
Filed June 2, 1961 5 Sheets-Sheet 1
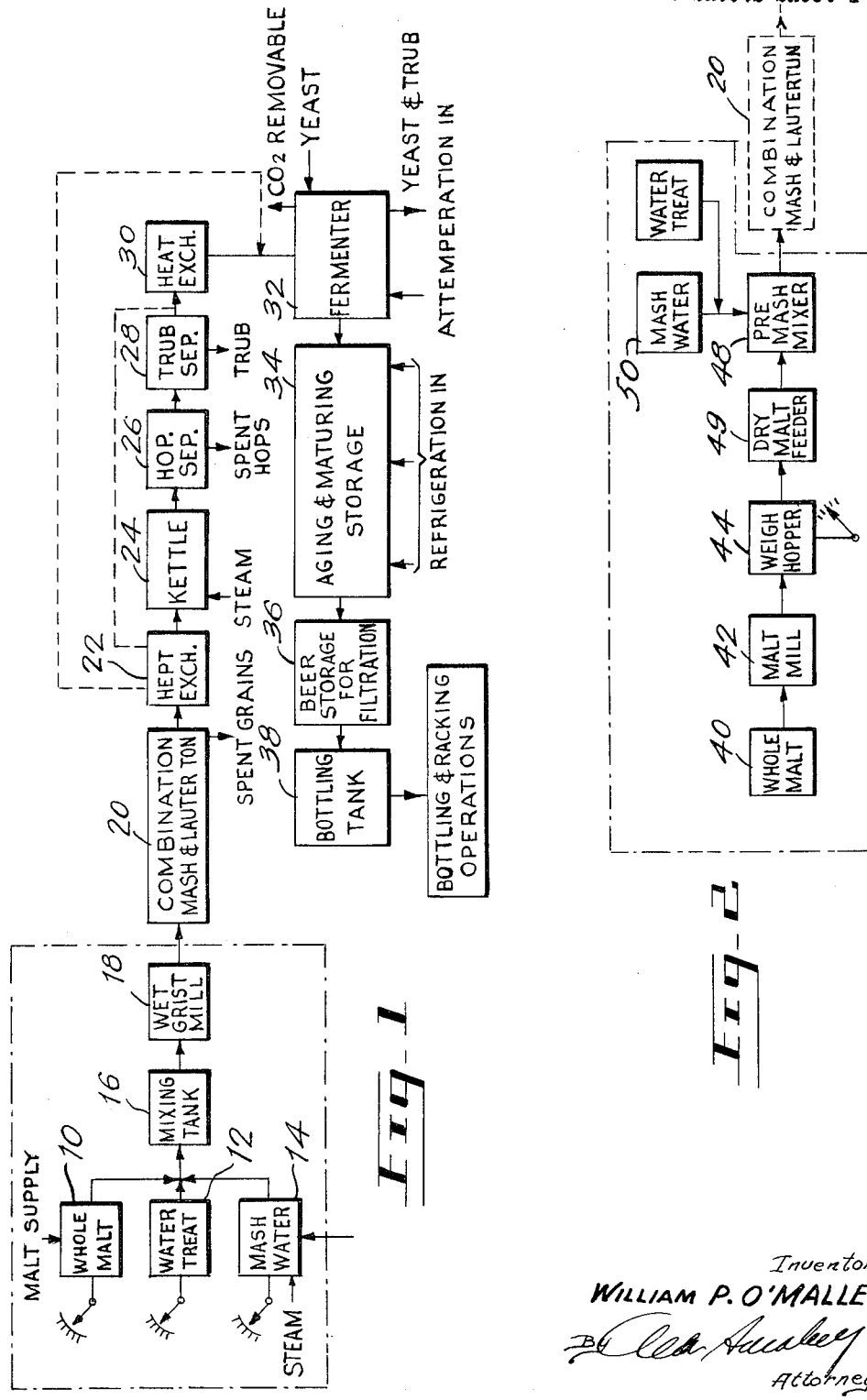
Inventor
WILLIAM P. O'MALLEY
Attorney

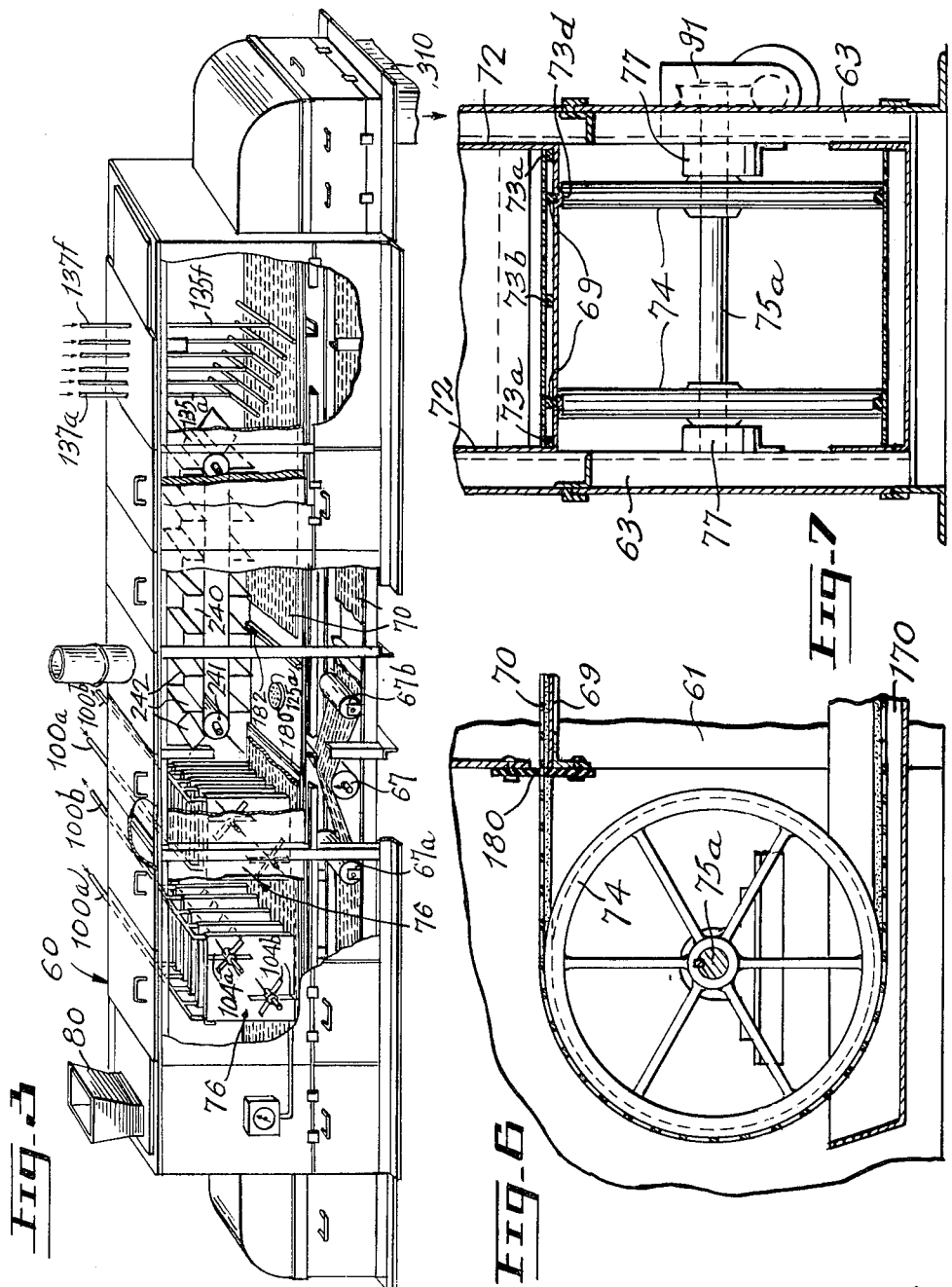

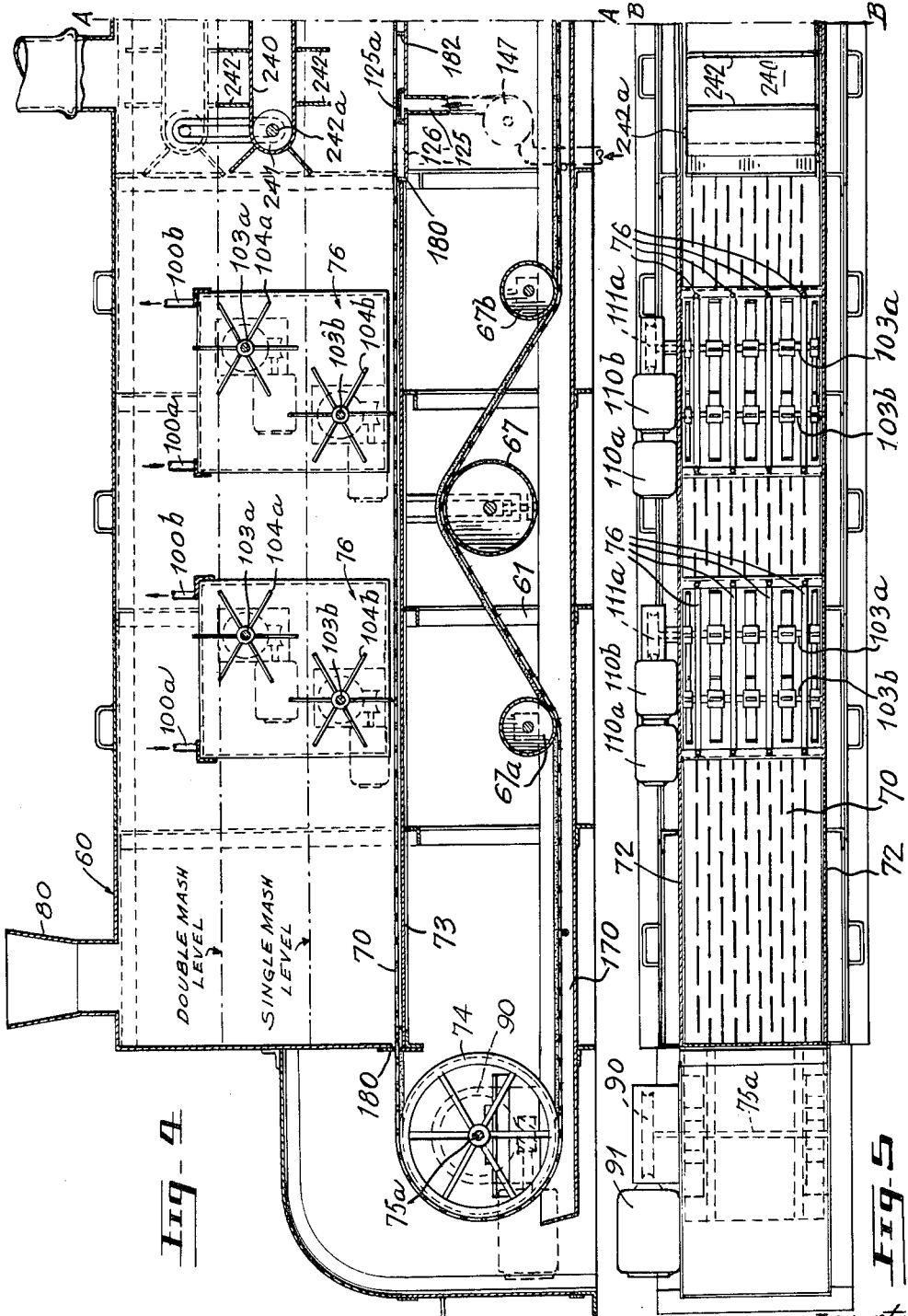

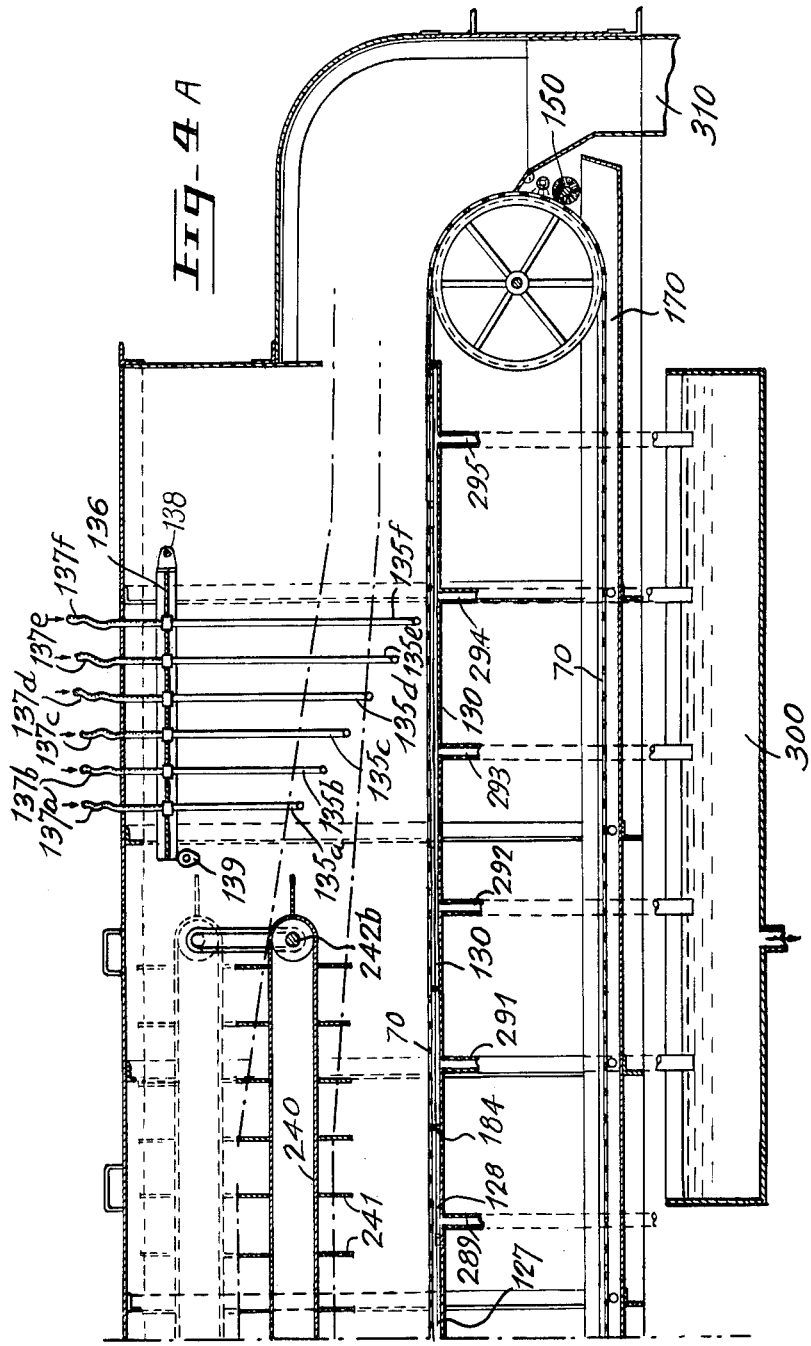

Feb. 1, 1966  W. P. O'MALLEY  3,232,211
CONTINUOUS BREWING APPARATUS
Filed June 2, 1961  5 Sheets-Sheet 5
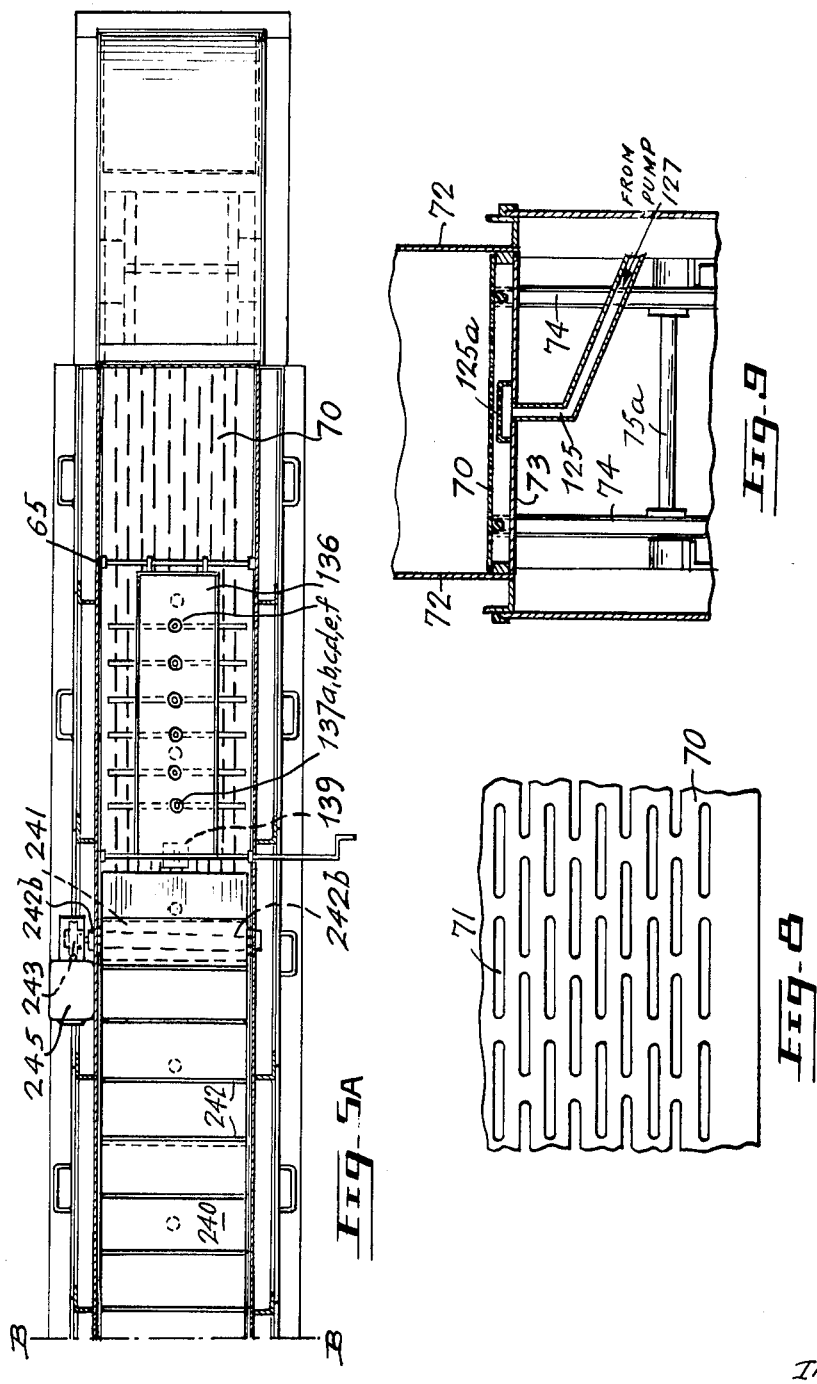
Inventor
WILLIAM P. O'MALLEY
By
Attorney United States Patent Office
3,232,211
Patented Feb. 1, 1966

3,232,211
CONTINUOUS BREWING APPARATUS
William P. O'Malley, Montreal, Quebec, Canada, assignor to O'Malley Brewery Ltd., Montreal, Quebec, Canada
Filed June 2, 1961, Ser. No. 114,417
5 Claims. (Cl. 99—278)

Despite the many technological advances made in the art and science of brewing, particularly within the last 25 years, one aspect of brewing remains basically unchanged though greatly improved and modernized, and that is batch processing of beer.

Attempts have been made in the industry to circumvent the old batch processing operation by the provision of continuous cycling apapratus which accelerates or condenses the batch process by eliminating or combining the usual individual operations.

Since the individual operations, which together make up batch processing, have given such excellent results and have found universal acceptance, the present invention aims to provide a continuous brewing process based on the principles of batch processing.

The present apparatus is designed so as to incorporate all of the operations and techniques used in the batch process. Thus, by imparting continuity to the individual batch process operations, the result obtained is a continuous brewing process, which can perhaps best be described by the somewhat contradictory statement, that it is the batch process made continuous.

The continuous brewing process of the invention is accordingly based on the principles of batch processing, and it follows that for each unit of the batch process, there must be a corresponding unit for the continuous process.

Since the sequence and nature of the batch operations in any of its units are already established and well defined, the design of the continuous unit is consequently limited and governed to some extent by the physical aspect of the batch operations for that unit.

As a result, the design of the present continuous unit was made around the operations existing in the batch unit, imparting the added factor of continuity to the operations without altering their character or nature in any way.

In order to duplicate the batch process while maintaining the desired continuity certain new apparatus must be provided to take the place of the apparatus where separate fillings, mixings, restings and withdrawal were necessary with the batch process. With this in mind the present invention provides such apparatus as will be described in more detail later and wherein a main feature resides in the construction of a combination mash and lauter tun designed specifically for continuous operation.

Having thus generally described the nature of the invention, particular reference will be made to the accompanying drawing illustrating generally the continuous brewing process of the invention with particular reference to the mashing and lautering apparatus, and in which:

FIGURE 1 is a diagrammatic flow sheet showing a continuous brewing process in accordance with the invention.

FIGURE 2 is a further diagrammatic flow sheet showing an alternative form of the portion of the process leading to the mashing and lautering.

FIGURE 3 is a view in perspective elevation of a continuous mash and lauter tun in accordance with the invention.

FIGURES 4 and 4A when combined, is an enlarged sectional view in side elevation of the construction shown in FIGURE 3.

FIGURES 5 and 5A when combined, is a plan view partially in section of the construction shown in FIGURE 3, corresponding to FIGURES 4 and 4A.

FIGURE 6 is an enlarged detail view partially in section of one end of the continuous belt forming the false bottom.

FIGURE 7 is an end view of the construction shown in FIGURE 6.

FIGURE 8 is an enlarged detail view showing a portion of the perforated belt.

FIGURE 9 is a cross-sectional view of FIGURE 4A along the line 9—9 showing a typical run-off.

Prior to describing the details of the preferred construction illustrated the cycle of operations followed in the prior art and the present method will now be reviewed in more detail.

In the usual batch processing of beer the cycle of operation is usually as follows:

(1) The vessel or apparatus is filled with material.
(2) The operation (or reaction(s)) take place in the vessel.
(3) The vessel is emptied of its contents once the operation is completed.
(4) The vessel is cleaned and sometimes sterilized and made ready for another cycle.

In continuous processing of beer, according to the invention, steps (1), (3) and (4) of batch processing numerated above are eliminated entirely since the vessels or apparatus are always filled to their operating capacity. Only step (2) remains, and the operation (reaction(s)) takes place continuously. Thus the vessels or apparatus are constantly being put to use exclusively for their ultimate purpose, namely to carry out the steps required in the processing.

The elimination of the 3 steps above is immediately indicative of some advantages of continuous brewing. The down-time of the apparatus is eliminated. Less labour is required since the vessels do not have to be filled, emptied and cleaned. The size of the units is much reduced for the same volume produced by the batch process, because the apparatus yields continuously. The peak loads on the services such as steam, power and refrigeration are eliminated in continuous processing because the quantity of products produced per unit time is constant. The capital expenditure for the brewing apparatus proper and for the units supplying the services is considerably reduced with the continuous process, as compared to that required for the apparatus for the batch process of an equivalent volume, because there is a smaller quantity of products processed per unit time.

What is perhaps not quite as evident is that continuous processing of beer, by virtue of its continuity, that is the continuity of the individual unit operations that make up the continuous process, results in greater uniformity of product. The set of conditions regulating the operation at any one point can be maintained more rigidly within the limits prescribed because of the smaller masses of material involved, and more important because of the fluidity of the process. For example, if one of the conditions imposed at a point deviates beyond the established limits dictated by the particular operation at this point, only a small quantity of material will be affected, because of the small quantities being processed per unit time. Further, because a new supply is constantly fed at the point in question, and because suitable instrumentation can readily detect and re-establish the desired conditions under which the operation must be carried out, this new supply is immediately processed under the established conditions. Generally speaking, and from what has been said above, a continuous process lends itself much more readily to automated control. In this way the various phases of the process can be monitored continuously, and the preset conditions, under which each of the individual unit operations must be carried out, can be more accurately maintained. The ultimate result is a more uniform product.

In order that the present process may be more clearly understood particular reference is made to the flow sheets of FIGURES 1 and 2. The sequence of operation followed is:

(1) A preset amount of whole malt is weighed out in whole malt hopper 10 from the main malt supply.

(2) A preset amount of mash water is metered into the mash water tank 14 from the main mash water supply. The mash water temperature is adjusted in the mash water tank 14.

(3) The weighted whole malt and metered mash water are fed simultaneously to the mixing tank 16 with a measured amount of water treatment from a water treatment tank 12.

(4) Retorification of the malt takes place in the mixing tank 16 while the grinding of the previous lot takes place in the wet grist mill 18. Preferably the mixing tank 16 is partitioned into two sections, so that while the contents of one section is supplying the wet grist mill 18, the contents of the other section is subject to retorification. As soon as one section is empty, a valve arrangement closes the outlet of the empty section to the wet grist mill 18, while simultaneously opening the full section to feed the mill 18. The empty section of the mixing tank 16 is refilled with whole malt, water and water treatment and retorification takes place, etc.

(5) The whole malt is ground wet and mixed with the mash water and water treatment to yield the malt mash which is fed to the combination mash and lauter tun 20. In this vessel 20 the constituents of the malt are transformed and made soluble with the result that a solution of malt extract is withdrawn from 20, passed through a heat exchanger 22 (optional) and fed to the kettle 24.

(6) The absorbed and occluded wort in the spent grains bed (insoluble portion of the malt) is washed out by means of sparge water, which is injected into the spent grains at various levels. This method of sparging, called "Continuous Infusion Sparging" is described in detail in the applicant's United States Patent 3,034,895.

(7) The spent grains are sent to a spent grains reservoir.

(8) The wort from the vessel 20 is preferably heated to about 200° F. in heat exchanger 22. This step is optional, as the wort could be fed directly from 20 to kettle 24 and heated to boiling directly in the kettle.

(9) The temperature of the wort entering at 200° F. into brew kettle 24 is raised to the boiling point. Hops are added to the boiling wort in three sections of the kettle corresponding to "1st, 2nd and 3rd hops" of batch processing.

(10) The spent hops are separated from the boiled wort in hope separator 26, sparged and pressed (optional) to remove the absorbed and occluded wort from the spent hops.

(11) The spent hops are sent to the sewer.

(12) From the hop separator 26 the wort is sent to the trub separator 28 where the trub or coagulated protein and other precipitated material is removed from the wort and collected for drying.

(13) The boiled hot wort, now free from hops and trub is passed through heat exchanger 30 or 22 and is cooled down to fermentation temperature, usually between 50° F. and 60° F.

(14) From the heat exchanger 30 the wort is fed to the fermenter 32 where yeast is added, and where fermentation takes place under rigidly controlled conditions. Wort is transformed into beer with the production of alcohol and $CO_2$ from the sugars.

(15) $CO_2$ gas is removed and stored. Yeast is removed and stored for future use, while the trub and other deposits are removed and dried.

(16) From fermenter 32, the end fermented beer is sent to an aging or maturing vessel 34. Here the beer is matured, that is the "green" character is gradually removed from the end fermented beer, $CO_2$ is added, protein compounds are precipitated and removed, and the maturing beer is chilled down to a lower temperature.

(17) From aging vessel 34 the beer is collected in beer storage tanks 36 from which it is filtered into bottling tanks 38 and finally to the bottling or racking units in the bottle-shop.

The complete process has taken approximately 25 days.

*Alternative as shown in FIGURE 2*

As an alternative to the wet grinding of the whole malt, dry grinding can be used. Dry grinding is the conventional method used in Canada and the United States.

(18) Whole malt is fed from whole malt hopper 40 to the malt mill 42.

(19) Grinding of the whole malt takes place in 42 which is then fed to the weight hopper 44.

(20) The ground malt is fed to the premasher of premash mixer 48 through a dry feeder unit 49 which dispenses the ground malt at a given rate.

(21) Mash water is also fed simultaneously into the premasher 48 from the mash water tank 50 at a given rate, along with a metered amount of mash water treatment. The ratio of malt to water is maintained constant.

(22) The mash mixture is then fed to the combination mash and lauter tun 20 as above.

*Combination mash and lauter tum*

A main feature of the present process shown diagrammatically in FIGURES 1 and 2 resides in the particular construction of the continuous mash and lauter tun shown in FIGURES 3 through 9.

This apparatus, as shown in FIGURE 3, is constructed as a complete self centered unit 20 having an exterior housing or casing 60 provided with the necessary openings and access doors as will be described.

As shown generally in FIGURES 4, 4A and 5, 5A, the main element of this construction consists of an endless perforated, slotted or screened false bottom or belt 70 travelling and contained in a trough 72. The floor 73 of the trough 72 is fitted with outlets that are connected to the various apparatus to carry out the filtration of the worth through the spent grains, see FIGURES 7 and 9. Inside the trough and above the false bottom 70 are heating exchange surfaces or units 76, mixing and kneading devices, and provision for injecting water or steam into the mash as will be described later.

The mash is admitted to this apparatus through a fixed feed funnel 80. An alternative to the fixed feed funnel, is one in which the discharge end can be given a forward and backward motion to spread the incoming mash more evenly (not illustrated). An adjustable levelling plate across the width of the trough would accomplish the same purpose. The size of the outlet of the funnel can be varied according to the feed rate.

The mash is laid on the slotted stainless steel belt 70 which moves forward at an optimum speed of 1.65 in. per min. This speed can be varied at will depending on the type of mash being made. The different rates of travel of the false bottom 70 adds to the flexibility of this design. The false bottom 70 can also be made of sectional slotted or perforated plates or a single endless belt as shown, preferably of stainless steel or of a plastic composition. The object of the false bottom is to retain the spent grains while providing a suitable base for the formation of a filter bed by the spent grains while carrying the mash into and through the various stages of treatment.

The endless belt 70, as shown, is made of stainless steel and is provided with regularly spaced apart slots 71, as shown in FIGURE 8. In the preferred construction illustrated the belt 70 is mounted for guided travel over the floor 73 of the trough 72 by grooved belt supporting and driving pulleys 74 which are mounted in pairs on shafts 75a, 75b journalled in suitable bearings 77 between frame members 63 of the main supporting frame 61 on which the housing 60 and various working elements are mounted and supported. The steel belt 70 is of a known type having continuous guiding ribs 69 bonded directly to the underside in spaced apart relationship matching the pulleys 74. A take up arrangement consisting of a spring mounted drum 67 and grooved rollers 67a, 67b are mounted on the frame 61 to maintain the belt 70 at the desired tension, see FIGURE 4. In order to provide additional support to the belt 70 and to maintain the desired spacing between the belt 70 and the floor 73, rubbing strips 73a, 73b, preferably of nylon or the like, are mounted on the floor 73, as shown most clearly in FIGURES 6 and 7. At the lowest section of the belt 70 relative to the floor 73 (starting section) the floor 73 is grooved or indented, as indicated at 73d to provide the necessary clearance for the ribs 69. A suitable drive pulley 90 is attached to the shaft 75a exteriorly of the frame members 63 and driven by suitable connections from a motor 91, as shown most clearly in FIGURE 5.

The mash (ale for example) temperature at the inlet is usually 140° F. for ale. As the mash rests on the false bottom 70 it is carried along in the body of the unit and through stationary heat exchange surfaces 76. The stationary heat exchange surfaces 76 are each built as comprising a rectangular cell or hollow plate with provision made for the entry and discharge of a suitable heating medium by conduit 100a, 100b. The heat exchange surface or units 76 are mounted in spaced apart relationship so as to extend longitudinally above the path of the belt 70 so that as the mash is conveyed along it is divided into several streams which pass between the units 76. Here the desired biochemical, chemical and physical reactions take place in the mash to produce the wort of the desired type. Between each plate 76 there is a spoked wheel-like pump made up of two spoked shafts which rotates much like a centrifugal pump. The shafts 103a, 103b making up these pumps are provided with spokes 104a, 104b offset from one another being distributed from one side of the hub to the other around its 360° circumference. As the spokes rotate, they mix the mash, bringing it from side to side against the surface of the plates of the heat exchangers 76 and helping to push the mash through the space between the plate faces of the heat exchanger. For very thick or viscous mashes it might be necessary to make provisions for additional means of carrying the mash forward at the same speed as that of the false bottom 70. As shown, in the preferred construction there are four (4) sets of heating surface plates in each unit 76 spaced across the width of the belt 70 and five (5) sets of spokes 104a, 104b making up the pumps 102 therebetween. The shafts 103a, 103b are driven by motors 110a, 110b through gearing arrangements 111a, 111b. The belt or false bottom 70 could then be fitted with angles at every 1', 2' or 3' or the bottom 73 could be fitted with vertical flat bars which would act as scrapers along the sides of the trough 72 where resistance would be greatest (not illustrated). The size of the surface of the plates making up the heat exchangers 76 can be varied at will depending on the type of mash desired. If a rapid rise in temperature (of the mash) is desired, then the heating surface would be smaller, i.e. shorter, but the heating medium would be at a higher temperature. The number of heat exchangers 76 can be varied from one to five or more depending on the type of mash desired. In this section of this unit, i.e. the mashing end, provision is made for injecting live steam and water to vary the temperatures and consistency of the mash. It can be appreciated that a variety of kneaders and mixers could be used instead of the spoked wheel design.

The false bottom 70 travels about 1/8" from the real bottom 73 in the mash section, then the real bottom 73 drops about 7/8" in the lautering section indicated at 120, so that there is now about 1" between the real 73 and false bottom 70.

One condition essential to this design is that there must be no relative movement between the travelling false bottom or belt 70 and the grains, and the spent grains act on the filter bed, or filtering medium for the wort.

The mash is then carried along the trough 72, being alternately pulled through the "heating zones" and "resting zones" (distances between heat exchangers 76) until the mash reaches the lautering section 120 of the unit. During the mashing operation proper, the various temperatures of the mash are controlled by a controller-recorder. The heat is supplied by steam or hot water.

In the "lautering section" the mash consistency can be quite fluid and provision is made to contain the mash within the section above the belt or false bottom 70 by providing an endless belt 240, filled with dividers or plates 242 at right angles to the belt and spaced sufficiently close 1' or 2'. These plates 242 dip into the mash and isolate sections of the mash corresponding to the operations taking place at the bottom of the trough 72. Stationary paddle wheel type retainers can also be installed, the speed of rotation being about or to the speed of the travelling false bottom 70. The endless belt 240 is mounted between rollers 241 mounted on shafts 242a, 242b. The shafts 242b are mounted in the frame 61 of the machine so as to be capable of adjustment relative to the travel of the belt or false bottom 70 to take care of varying levels of mash, as indicated in dotted lines in FIGURE 4A, with provision for driving the belt 240 being made by a gearing arrangement 243 on the shaft 242b and a driving motor 245. As the mash is carried forward on the travelling false bottom 70, it is positioned over various sections of the real bottom 73. These sections 126, 127, 128 are fitted with outlets 125 and these outlets are piped to pumps, grants etc., to effectively carry out the same operations which occurs in the batch type lauter tun.

The mash is positioned over conduit 125 capped by a perforated deflector plate 125a (the "underlet" section indicated at 126) which is connected to a hot water supply and pump 147. Once the mash is in position over the underlet section 126, the pump 147 is automatically started and a metered amount of underlet water is forced up through the false bottom 70 at a rapid rate, in order to raise the mash from the false bottom 70. This action might take 20–30 secs. The pump is stopped and the mash is allowed to rest for a travelling distance of about 3'.

The space between each section is divided by means of dividers 180, 182, 184, i.e. each section is formed by means of these dividers extending transversely across the line of travel of the bottom 70. The underlet section 126 covers about 2' of false bottom 70 and a rest section indicated at 127 is about 1' in length. Again these can be altered to suit the conditions of a particular mash.

After leaving the "rest section" 127 the mash is carried forward and is positioned over the "vorlöff section" 128 or pump-back sec. or recirculating secs. This operation consists of withdrawing wort from the bottom of the apparatus, through the filter-bed of spent grains, and pumping it back over the top of said filter-bed. The purpose of the operation is to remove the unfiltered wort from beneath the filter-bed, and to complete the formation of the filter-bed. This operation is continuous. The wort is pumped from the bottom of the mash bed through outlet 289 and sent back to the surface of the mash, thus forming the filter-bed and removing any filtered wort from that section. The mash has then been carried over the "run-off section" 130. Here the real bottom 73 is fitted with outlets 291, 292, 293, 294, 295, one for about every 2 sq. ft. of filtering surface (this can be varied)

which discharge into the grant 300 or collector, and pumped to the kettle through a heat exchanger. The function of the run-off section 130 is to withdraw the wort from the spent grains by filtering it through the filter bed made up of spent grains. In addition, in the run-off section 130, there is a sparging device to wash out any absorbed and occluded wort from the spent grains. An apparatus for C.I.S. (continuous infusion sparging) is shown by way of an example in this drawing, but conventional overhead sparging can also be used. In the arrangement shown a plurality of rigid conduits 135a, 135b, 135c, 135d, 135e, 135f, are provided as being arranged in rows of graduated length on a supporting frame 136, each row being supplied from a source of sparging water by flexible conduits 137a, 137b, 137c, 137d, 137e, 137f. The supporting frame 136 is hingedly connected at one end to the supporting frame 65 as indicated at 138 while the other end rests on a cam shaft 139 extending across the machine frame. Rotation of the shaft 139 permits adjustment of the frame 136 and consequently the sparge water conduits to a suitable level or permits imparting a constant agitation or movement of the sparge water conduit through the grains bed as it travels beneath the sparging device. The graduated lengths of the sparge conduits also make it possible to control the amount of sparge water delivered to the grains bed proportionately to the depth of the bed on the belt or travelling false bottom 70. Outlets 291 and 292 withdraw undiluted wort. Outlets 293, 294, 295, withdraw progressively diluted wort. Once the wort has been withdrawn, the spent grains are carried along to the end of the unit where they are discharged by gravity onto a spent grains chute 310 as shown.

The false bottom 70 is then brushed and rinsed by brushing and spraying arrangement 150 to remove any adhering spent grains.

The false bottom 70 is then made to travel in a pan 170 undersneath the unit. The function of this pan 170 is to clean the travelling false bottom 70. It can be divided into compartments and these can be filled with any desired cleaning agents, or etc. After passing through the pan 170 which extends the length of the unit, the belt 70 is cleaned (could be sterile) and re-enters the trough 72 at 180. The capacity of the unit can be increased by increasing the depth of grains, widening the unit, or increasing the speed of travel of the false bottom.

I claim:

1. A continuous mash and lauter tun comprising in combination a supporting framework, an elongated trough supported on said frame so as to extend horizontally along the length of said framework, an endless perforated conveyor mounted for travel along the length of said trough with its upper run fitting closely within said trough in parallel vertically spaced relationship with the bottom of said trough constituting a travelling false bottom adapted to support and convey the grains mash through a plurality of stations along the length of said trough corresponding to the known batch sequences for transforming the constituents of the malt rendering them soluble, means for introducing the mash to the beginning of said travelling false bottom, heating means disposed in the path of said travelling false bottom upper run adapted to heat said mash as it progresses, the space between said travelling false bottom and fixed trough bottom in the portion following said heating means being divided transversely of the length of said trough into a plurality of wort receiving compartments, means connected to a first one of said compartments for adding water to said mash and means connected to a third one of said compartments for circulating said wort including run-off conduits extending from the portions of said trough bottom within each of the remaining ones of said compartments, a main wort receiving tank adapted to receive wort from said run-off conduits, means for progressively confining the upper surface of said mash above said travelling false bottom for at least an initial portion of said circulating and wort run-off area, means for introducing sparge water into said mash above said travelling false bottom and following said upper mash confining means, and means for discharging the spent grains bed from said travelling false bottom at the terminal end of said run-off area, said framework and elements supported thereby being enclosed in a housing extending the length of said tun.

2. A continuous mash and lauter tun as claimed in claim 1, wherein said endless conveyor comprises an endless metal belt having regularly spaced perforations throughout its length.

3. A continuous mesh and lauter tun as claimed in claim 1, wherein said means for confining said mash above said travelling false bottom comprises an endless belt mounted for travel above and parallel with said false bottom, said belt having attached thereto at regularly spaced intervals outstanding plates adapted to divide the said travelling mash transversely of its line of travel and progress in sequence with said mash during said travel.

4. A continuous mash and lauter tun as claimed in claim 1, wherein said means of supplying sparge water comprises a supporting frame mounted above the line of travel of said moving false bottom and a plurality of water delivering conduit mounted in said frame in rows of gradually increasing length in the direction of travel of said false bottom.

5. A continuous mash and lauter tun as claimed in claim 1, wherein said heating means comprises a plurality of hollow plates disposed in spaced apart relationship in the path of said travelling false bottom, and means to supply a heating medium to the interior of said plates.

References Cited by the Examiner
UNITED STATES PATENTS

| | | | |
|---|---|---|---|
| 2,529,882 | 11/1950 | Mittman | 210—400 |
| 2,894,481 | 7/1959 | Compton et al. | 99—52 |

ROBERT E. PULFREY, *Primary Examiner.*

TOBIAS E. LEVOW, A. H. WINKELSTEIN,
*Examiners.*